(12) United States Patent
Takahashi et al.

(10) Patent No.: US 6,922,842 B2
(45) Date of Patent: Jul. 26, 2005

(54) OPTICAL PICK-UP DEVICE

(75) Inventors: Kenji Takahashi, Kokubunji (JP); Kohshin Nakayama, Kiyose (JP)

(73) Assignee: TEAC Corporation (JP)

(*) Notice: Subject to any disclaimer, the term of this patent is extended or adjusted under 35 U.S.C. 154(b) by 0 days.

(21) Appl. No.: 09/924,270

(22) Filed: Aug. 7, 2001

(65) Prior Publication Data

US 2002/0071357 A1 Jun. 13, 2002

(30) Foreign Application Priority Data

Dec. 12, 2000 (JP) .......................................... 2000-377692

(51) Int. Cl.[7] ............................................. G11B 7/085
(52) U.S. Cl. ........................................ 720/684; 720/683
(58) Field of Search .............................. 369/75.1, 75.2, 369/219, 44.14, 44.1, 44.16; 720/683, 684; 358/824, 814

(56) References Cited

U.S. PATENT DOCUMENTS

| | | | | |
|---|---|---|---|---|
| 4,773,062 A | * | 9/1988 | Wada et al. | 369/44.16 |
| 5,264,968 A | * | 11/1993 | Masunaga | 359/824 |
| 5,265,079 A | * | 11/1993 | Getreuer et al. | 369/44.14 |
| 5,475,661 A | * | 12/1995 | Tomita et al. | 369/44.16 |
| 5,488,603 A | * | 1/1996 | Tomita et al. | 369/219 |
| 5,521,762 A | * | 5/1996 | Tomiyama et al. | 359/814 |
| 5,566,149 A | * | 10/1996 | Song | 369/44.15 |
| 6,330,120 B1 | * | 12/2001 | Shibusaka et al. | 359/814 |
| 6,404,728 B1 | * | 6/2002 | Shinozuka et al. | 369/244 |
| 2001/0028628 A1 | * | 10/2001 | Suzuki et al. | 369/244 |

FOREIGN PATENT DOCUMENTS

| | | | |
|---|---|---|---|
| JP | 62-031036 A | 2/1987 | |
| JP | 08-315388 | * 11/1996 | ............ G11B/7/09 |
| JP | 10-198986 | 7/1998 | |
| JP | 11-306560 | * 11/1999 | ............ G11B/7/09 |
| JP | 2000-32507 | * 2/2000 | ............ G11B/7/00 |
| JP | 2001-093173 | 4/2001 | |

OTHER PUBLICATIONS

MAT (Machine assisted translation) of JP 2001–093173.*
MAT (Machine assisted translation) of JP 10–198986.*

* cited by examiner

Primary Examiner—Aristotelis M. Psitos
(74) Attorney, Agent, or Firm—Anderson Kill & Olick, PC

(57) ABSTRACT

An optical pick-up device includes a lens that focuses light onto a recording medium, a lens holder that holds the lens, a suspension holder that supports the lens holder disposed opposite a distal end of the lens holder, a frame formed so as to be disposed opposite both lateral surfaces of the lens holder and the distal end of the lens holder, the frame supporting the suspension holder, a plurality of elastic supports that movably support the lens holder, a distal end of the elastic supports mounted on the suspension holder, and an actuator that drives the lens holder, wherein a plurality of projections is provided on at least one of the lens holder, the frame and the suspension holder, the projections acting as stoppers that restrict a rotation of the lens holder so as to prevent excessive deformation of the elastic supports.

9 Claims, 9 Drawing Sheets

OPTICAL PICK-UP DEVICE

BACKGROUND OF THE INVENTION

1. Field of the Invention

The present invention relates generally to an optical pick-up device, and more particularly, to an improved optical pick-up device for reading and/or writing information to and from a recording medium, in which a lens holder that holds a lens that focuses light onto a recording surface of the recording medium is movably supported by cantilever springs.

2. Description of the Related Art

In for example CD-ROM or CD-RW disk drive units in which a rotating disk-like recording medium (hereinafter simply disk) is loaded, a laser beam is projected onto the disk and information is recorded (written) onto the disk or reproduced (read) from the disk. The optical pick-up device installed in such types of disk drive units includes, among other components, an object lens that directs a laser beam emitted from a laser diode onto the disk. The orientation of the object lens is adjusted so that the focus of the light directed onto the disk by the object lens coincides with a recording surface of the disk.

In other words, an optical pick-up device performs focus control and tracking control so that the object lens follows changes in the track due to eccentricities in the rotation of the disk and/or wobble due to rotation of the disk. This type of control of the object lens is performed by an actuator using an electromagnetic force, the actuator being typically composed of a combination of a coil and a magnet.

A lens holder that supports the object lens is made compact and lightweight in order to facilitate focus and tracking control, with four wire-like elastic supports (that is, cantilever springs) arranged in parallel forming a supporting structure that supports the lens holder and that moves minutely in either a focus direction or a tracking direction, as the case may be, by the driving force from the actuator.

Further, the lens holder is placed so as to be contained within a frame formed into the shape of the letter U, the open portion being at a proximal end. Base portions of the four wire-like elastic supports are joined to a suspension fixedly mounted on a distal end of the frame, with tip portions joined to the lateral surfaces of the lens holder. As a result, the lens holder is supported by the four wire-like elastic supports in such a way as to be movable in a direction parallel to the frame.

However, a drawback of the above-described conventional optical pick-up device is that, when installed in a laptop personal computer or other similar portable apparatus and such apparatus is dropped during handling, the movement of the lens holder caused by such an impact on the pick-up unit is greater than that which is normally imparted thereto, thus damaging the wire-like elastic supports.

It is possible to provide the lens holder with lateral projections protruding therefrom, so that the projections contact the frame so as to restrict the range of movement of the lens holder and thus prevent the lens holder from being damaged by excessive movement. However, if the center of gravity of the lens holder and the center drive point of the actuator diverge from each other, an angular moment comes into play around the projection after the projection contacts the frame, thus twisting or rotating the lens holder around the tip of the projection and thereby deforming the wire-like elastic supports.

With the disk drives installed in laptop personal computers in particular, in which a seek direction (that is, the tracking direction) of the optical pick-up is slanted at approximately a 45 degree angle with respect to a front panel of the disk holder (thus taking advantage of the additional length afforded by using a corner of the disk drive unit frame instead of a lateral side of the frame), the direction of the shock of impact upon dropping the laptop (assuming the laptop is dropped on the front panel of the disk holder) and the direction of drive of the actuator are at approximately a 45 degree angle with respect to each other. In short, the structure easily allows an angular moment to be generated about the tip of the projection of the lens holder, thereby deforming the wire-like elastic supports.

If the wire-like elastic supports are thus deformed, then the positioning and angle of the lens can change and information can no longer be written to or read from the disk.

It is possible to use relatively thick wire for the wire-like elastic supports so as to prevent the wire-like elastic supports from being deformed by the shock of impact. However, the thicker the wire the more rigid the wire-like elastic support, which makes it more difficult to move the primary resonance frequency (at which focus control and tracking control low-frequency sensitivity tends to deteriorate) to a desired frequency.

In order to set the primary resonance frequency to a desired frequency and prevent focus control and tracking control low-frequency sensitivity from deteriorating, the longer the suspension the better. However, the conventional optical pick-up typically installed in an ordinary laptop computer, and particularly the recording pick-up, has a substantial number of mounted parts, thus limiting the space available to lengthen the suspension.

More specifically, there is limited space in which to accommodate the optical pick-up devices of the disk drive units typically installed in laptop computers. Optical pick-up devices of optical disk drive units that can record are becoming more common, but these, too, have the disadvantage of a large number of component parts as compared to the read-only type of optical pick-up device, thus placing additional constraints on the already limited amount of space available for installation. For both these reasons, the wire-like elastic supports can be neither lengthened nor thickened. Additionally, thickening the wire-like elastic supports reduces their sensitivity, which is undesirable.

SUMMARY OF THE INVENTION

Accordingly, it is an object of the present invention to provide an improved and useful optical pick-up device, in which the above-described disadvantage is eliminated.

The above-described object of the present invention is achieved by an optical pick-up device comprising a lens that focuses light onto a recording medium; a lens holder that holds the lens; a suspension that supports the lens holder disposed opposite a distal end of the lens holder; a frame formed so as to be disposed opposite both lateral surfaces of the lens holder and the distal end of the lens holder, the frame supporting the suspension; a plurality of elastic supports that movably support the lens holder, a distal end of the elastic supports mounted on the suspension and a proximal end retained by the lens holder; and an actuator that drives the lens holder, the actuator including a focus coil, a tracking coil and at least one magnet, the optical pick-up device having a plurality of projections provided on at least one of the lens holder, the frame and the suspension, the projections acting as stoppers that restrict a rotation of the lens holder so as to prevent excessive deformation of the elastic supports.

According to this one aspect of the invention, excessive displacement of the lens holder due to impact can be prevented and a rotational moment prevented from acting on the lens holder, thus making it possible to prevent deformation of the cantilever springs and to prevent deterioration in the accuracy of the focus control and tracking control of the lens holder due to the impact of an external shock to the optical pick-up device.

BRIEF DESCRIPTION OF THE DRAWINGS

These and other objects, features, aspects and advantages of the present invention will become better understood and more apparent from the following description, appended claims and accompanying drawings, in which:

DETAILED DESCRIPTION OF THE INVENTION

A detailed description will now be given of an improved optical pick-up device according to the present invention, with reference to the accompanying drawings. It should be noted that identical or corresponding elements are given identical or corresponding reference numbers in all drawings, with detailed descriptions thereof given once and thereafter omitted.

Figure 1:
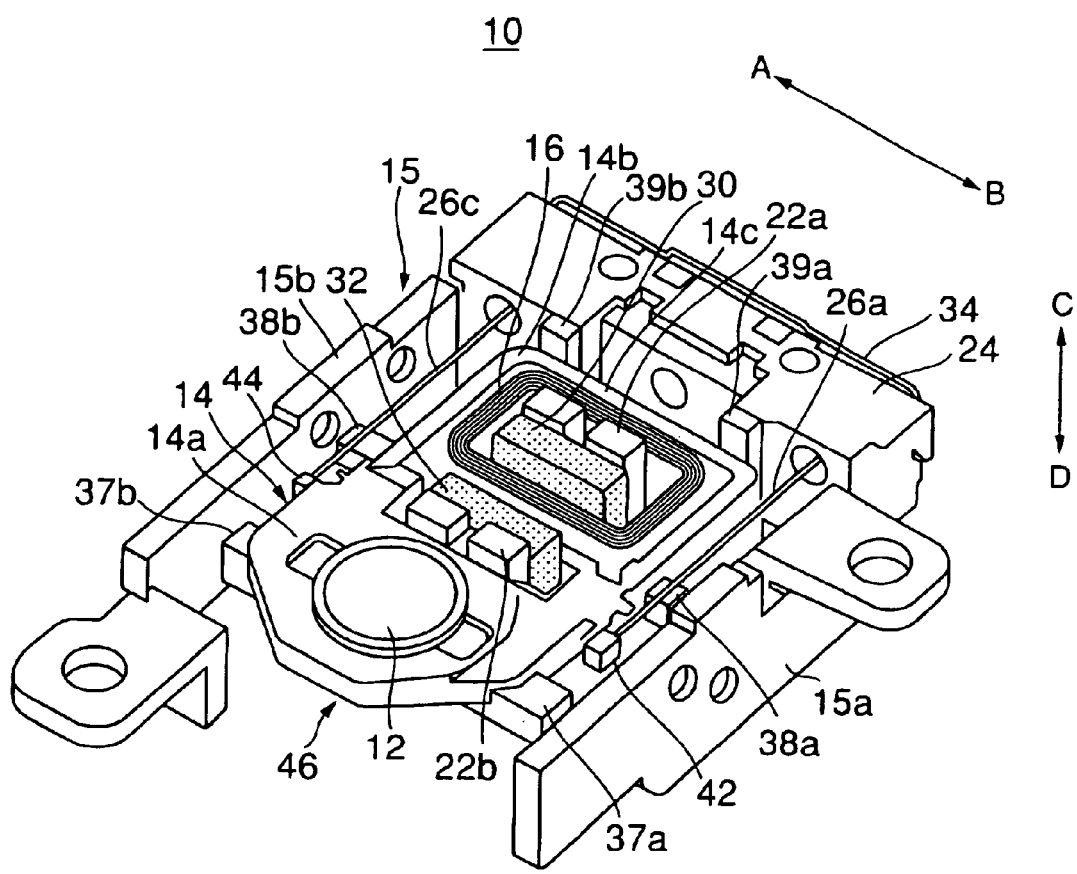
FIG. 1 is a perspective view of an optical pick-up device according to one embodiment of the present invention.
Figure 2:
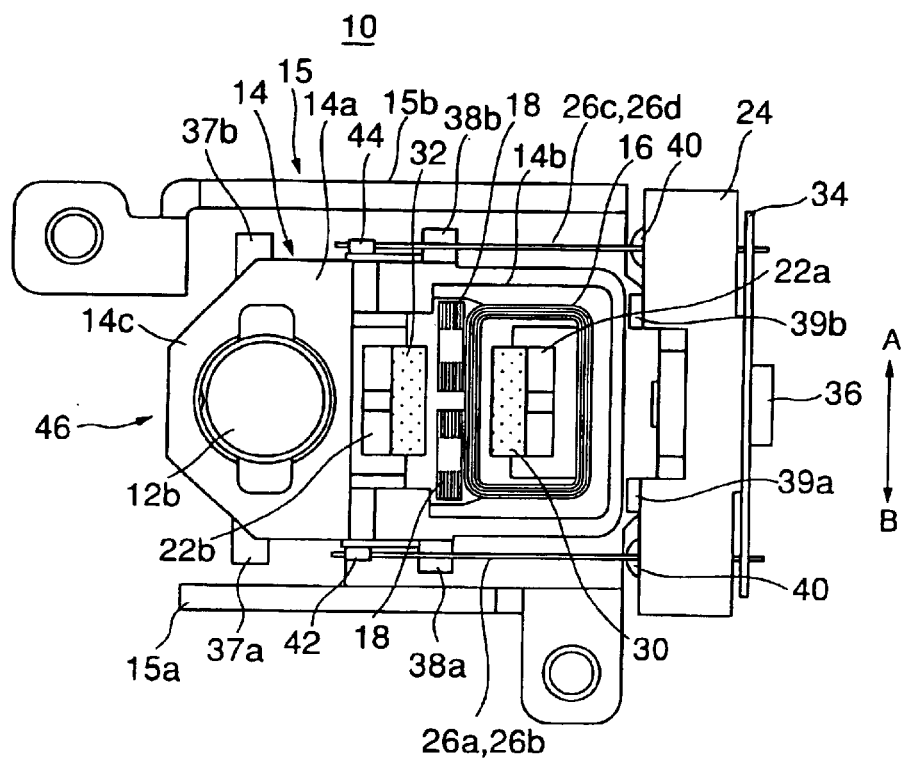
FIG. 2 is a plan view of an optical pick-up device according to one embodiment of the present invention.
Figure 3:
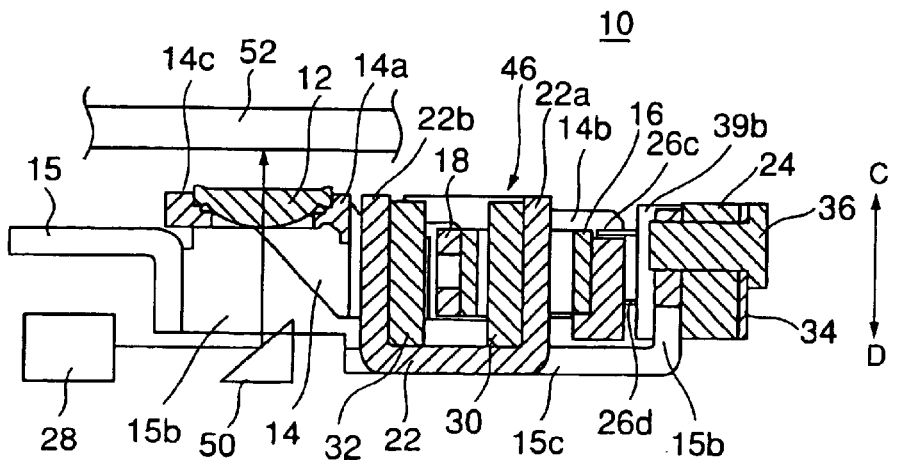
FIG. 3 is a lateral cross-sectional view of an optical pick-up device according to one embodiment of the present invention.
Figure 4:
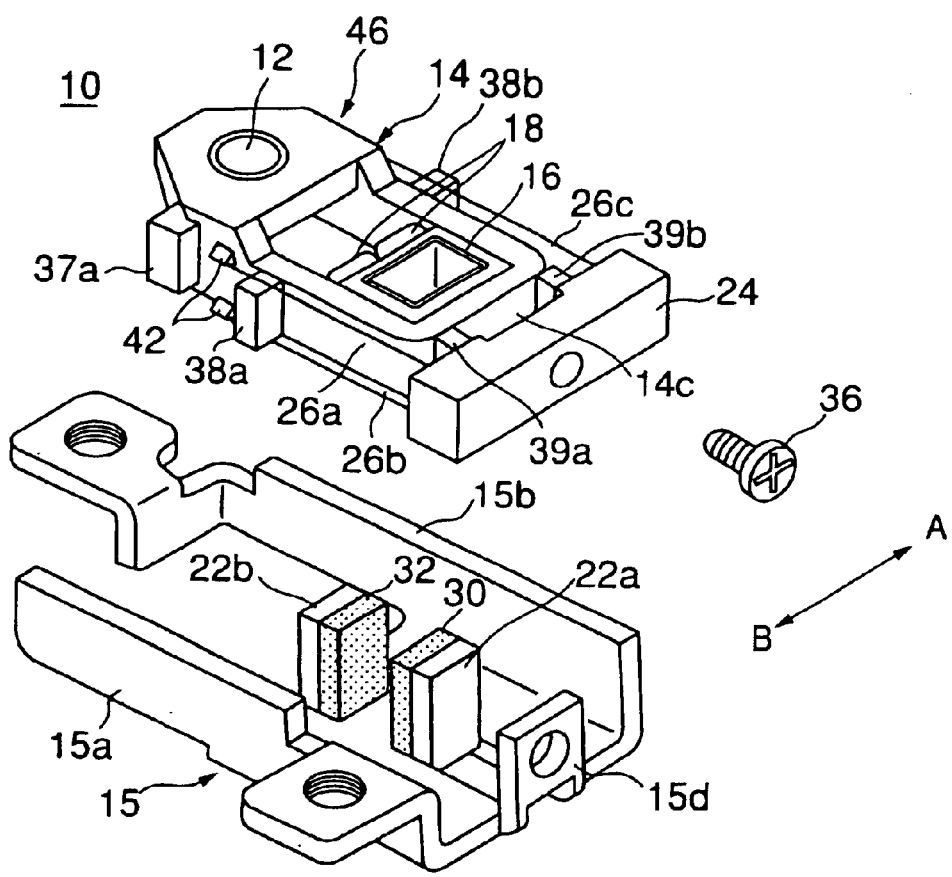
FIG. 4 is a perspective exploded view of a movable part and a yoke base that supports the movable part.

FIG. 1 is a perspective view of an optical pick-up device according to one embodiment of the present invention. FIG. 2 is a plan view of an optical pick-up device according to one embodiment of the present invention. FIG. 3 is a lateral cross-sectional view of an optical pick-up device according to one embodiment of the present invention. FIG. 4 is a perspective exploded view of a movable part and a yoke base that supports the movable part.

As shown in FIGS. 1–4, an optical pick-up device 10 comprises an object lens 12, a lens holder 14 that holds the object lens 12, a yoke base 15 (hereinafter frame 15) that supports the lens holder 14, a focus coil 16 mounted on the lens holder 14 and a tracking coil 18 mounted on the lens holder 14, a pair of magnets 30, 32, a yoke 22 integrally mounted on the frame 15 that supports the pair of magnets 30, 32, a suspension holder 24 fixedly mounted on the frame 15 and that supports four wire-like elastic supports—in actuality cantilever springs—26a, 26b, 26c and 26d positioned between the frame 15 and the lens holder 14. The lens holder 14 is thus supported by the four cantilever springs 26a–26d so as to be movable in a horizontal tracking direction (that is, a direction indicated by arrow A–B) as well as in a vertical focusing direction (a direction indicated by arrow C–D), the four cantilever springs 26a–26d being arranged in parallel The focus coil 16 is an actuator for driving the object lens 12 in a vertical direction. The tracking coil 18 is an actuator for driving the object lens 12 in the horizontal direction. The yoke 22, which has a pair of U-shaped arms 22a, 22b bent so as to extend vertically, is fixedly mounted on a floor plate 15c disposed between a pair of arms 15a, 15b extending horizontally from the frame 15. The magnet 30 is mounted on one arm 22a of the yoke 22 so as to pass through an interior of the focus coil 16. The magnet 32 is mounted on the other arm 22b of the yoke 22, opposite the tracking coil 18.

A first set of projections 37a, 37b project laterally from lateral surfaces of a proximal end of the lens holder 14. A second set of projections 38a, 38b project laterally from an intermediate position on the lateral surfaces of the lens holder 14. Finally, a third set of projections 39a, 39b project from the suspension holder 24 toward a distal end 14c of the lens holder 14.

The first set of projections 37a, 37b are shorter than the second set of projections 38a, 38b by approximately 1 to 2 mm, so when the lens holder 14 swings the second set of projections 38a, 38b contacts an inner surfaces of the arms 15a, 15b of the frame 15 first, after which the first set of projections 37a, 37b then contacts the inner surfaces of the arms 15a, 15b so as to restrict a rotation of the lens holder.

Additionally, as noted previously, the distal end 14c of the lens holder 14 opposes the third set of projections 39a, 39b, thus restricting a rotation of the lens holder 14 in a direction opposite the direction or rotation restricted by the first set of projections 37a, 37b when the distal end 14c of the lens holder 14 contacts the third set of projections 39a, 39b.

Accordingly, the contacting of the first set of projections 37a, 37b and the second set of projections 38a, 38b against the inner surfaces of the arms 15a, 15b of the frame 15 prevents a rotational moment from acting on the cantilever springs 26a–26d, thereby preventing the cantilever springs 26a–26d from being deformed by an excessive force and preventing a deterioration in accuracy in the focus control or tracking control of the lens holder due to the impact of an external shock.

The suspension holder 24 is fixedly mounted on a mounting part 15d of the frame 15 together with a printed circuit board 34 by a screw 36. A base portion of the cantilever springs 26a–26d, which are positioned so as to extend in a horizontal direction, penetrates the printed circuit board 34. A proximal tip (that is, a free end) of the cantilever springs 26a–26d passes above and below the second set of projections 38a, 38b. Additionally, silicon gel adhesives 40 for elastically mounting the cantilever springs 26a–26d are adhered to a proximal surface of the suspension holder 24. The adhesive 40 is gelled by ultraviolet radiation so as to provide the cantilever springs 26a–26d with a viscous damping effect with respect to movement of the lens holder 14 in a focus direction and movement of the lens holder 14 in a tracking direction.

Additionally, ends of the focus coil 16 and the tracking coil 18 are connected to relay substrates 42, 44 through which the free ends of the cantilever springs 26a–26d pass, with an electrical current being supplied to the focus coil 16 and the tracking coil 18 via the cantilever springs 26a–26d.

It should be noted that a movable part 46 subject to focus control and tracking control comprises the above-described object lens 12, lens holder 14, focus coil 16, tracking coil 18, and coil relay substrates 42, 44.

The object lens 12 supported by the lens holder 14 is adjusted to a position at which an electromagnetic force generated by the passing of current through the focus coil 16 and the tracking coil 18 is balanced with a magnetic force arising between the pair of magnets 30, 32.

A more detailed description will now be given of the structure of the lens holder 14.

The lens holder 14 has a lens holder part 14a and a coil holder part 14b that extends distally toward the suspension holder 24 from the lens holder part 14a and supports the focus coil 16 and the tracking coil 18.

As shown in FIG. 3, a laser beam (indicated by an arrow) emitted from a laser diode 28 is reflected by a reflecting mirror 50 toward the object lens 12, where it is focused onto a disk 12 disposed opposite to and above the object lens 12. The pair of magnets 30, 32 are disposed opposite the U-shaped mounting arms 22a, 22b of the yoke 22, and opposite the focus coil 16 and tracking coil 18 provided on the lens holder 14. As noted previously, the lens holder 14 is movably supported by the four cantilever springs 26a–26d that extend horizontally.

Figure 5:
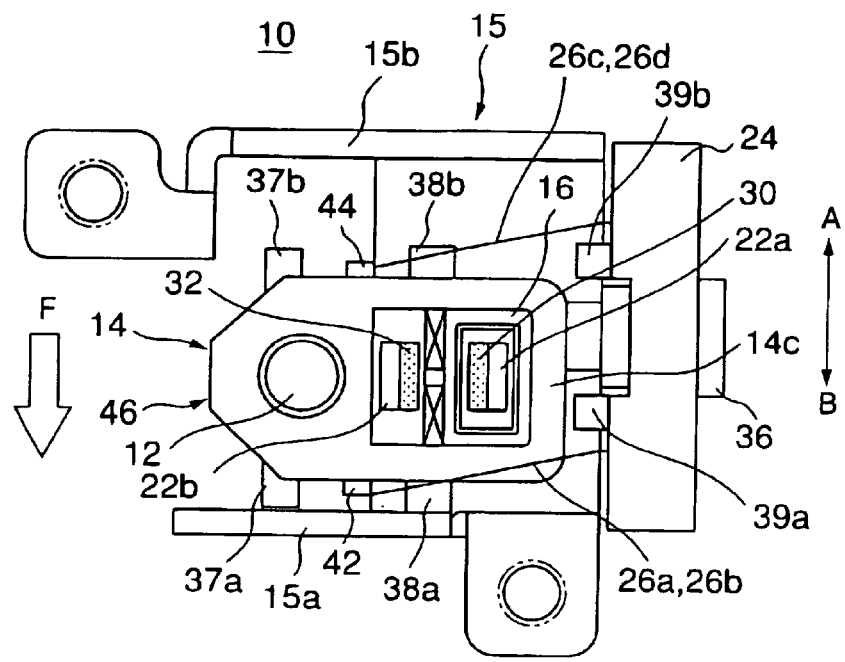
FIG. 5 is a plan view showing a case in which an impact acts in a direction B on an optical pick-up device according to the present invention.

FIG. 5 is a plan view showing a case in which an impact acts in a direction B on an optical pick-up device according to the present invention.

As shown in FIG. 5, in a case in which the optical pick-up 10 is subjected to an impact force F acting in the direction indicated as B in the drawing, the lens holder 14 supported by the four cantilever springs 26a–26d moves in the B direction and the second projection 38a projecting from the lateral surface of the lens holder 14 contacts the inner surface of the arm 15a of the frame 15, after which the first projection 37a projecting from the lateral surface of the lens holder 14 contacts the inner surface of the arm 15a of the frame 15. As a result, a counter-clockwise rotation of the lens holder 14 is stopped by the first projection 37a and the second projection 38a coming into contact with the inner surface of the arm 15a. Additionally, after the second projection 38a contacts the inner surface of the arm 15a, the third projection 39a extending proximally from the suspension holder 24 toward a distal end 14c of the lens holder 14 keeps the lens holder 14 from rotating in a clockwise direction.

Thus, damage to the cantilever springs 26a–26d can be prevented even in the event of an external shock to the unit because the first set of projections 37a, 37b, the second set of projections 38a, 38b and the third set of projections 39a, 39b function as stoppers that restrict the rotation of the lens holder 14.

A description will now be given of the above-described optical pick-up device 10 installed in a typical CD-ROM drive unit.

Figure 6:
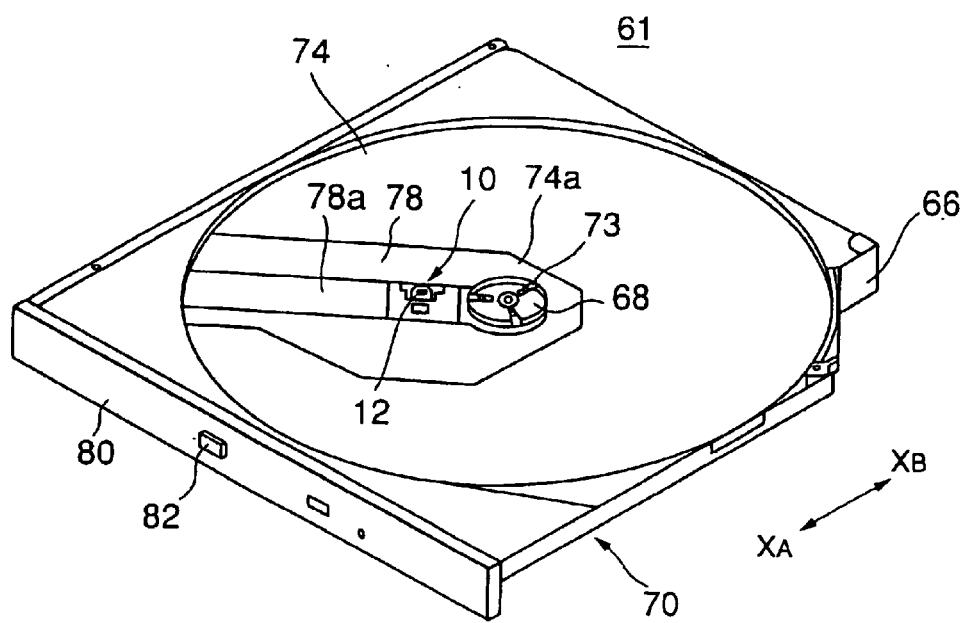
FIG. 6 is a perspective view of a disk drive unit.
Figure 7:
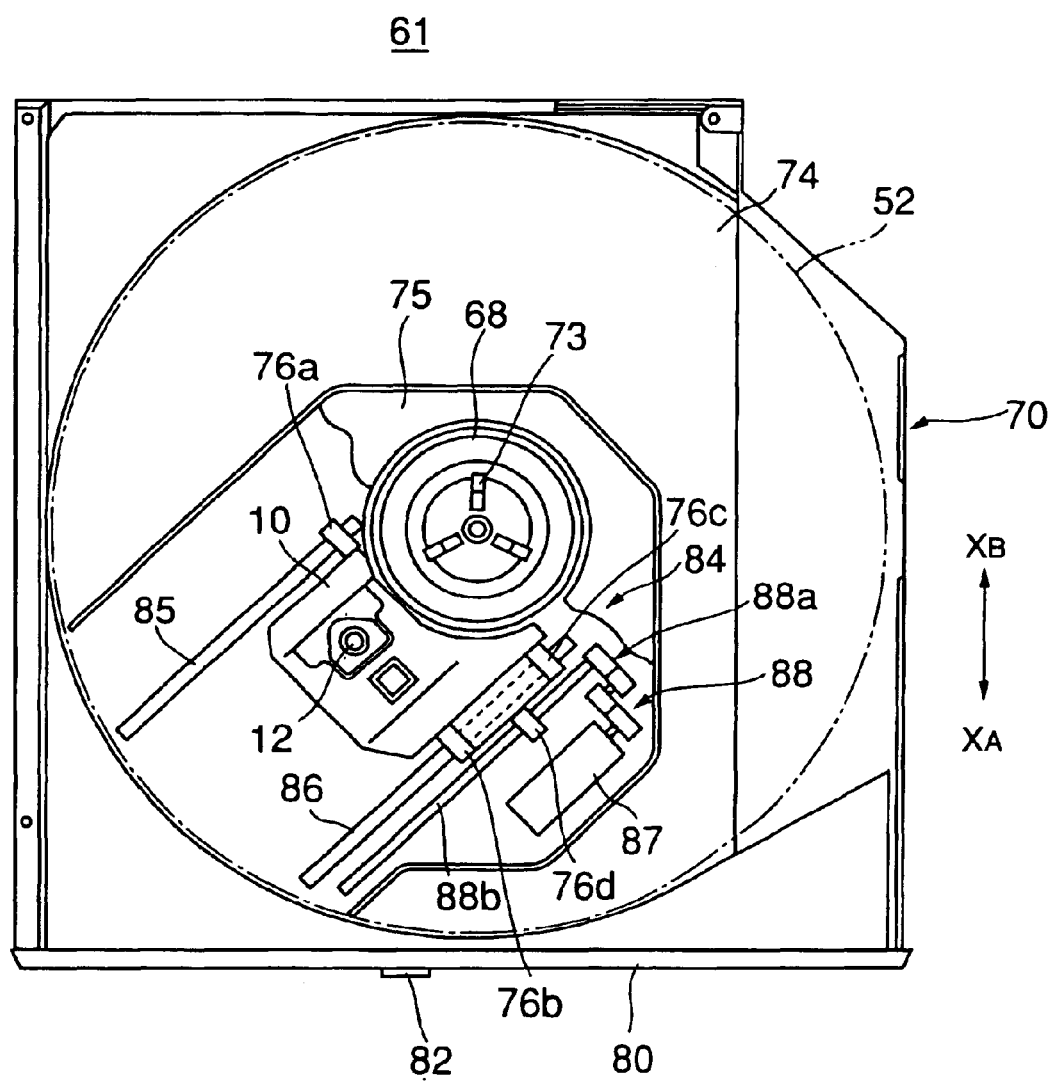
FIG. 7 is a plan view of a disk drive unit.
Figure 8:
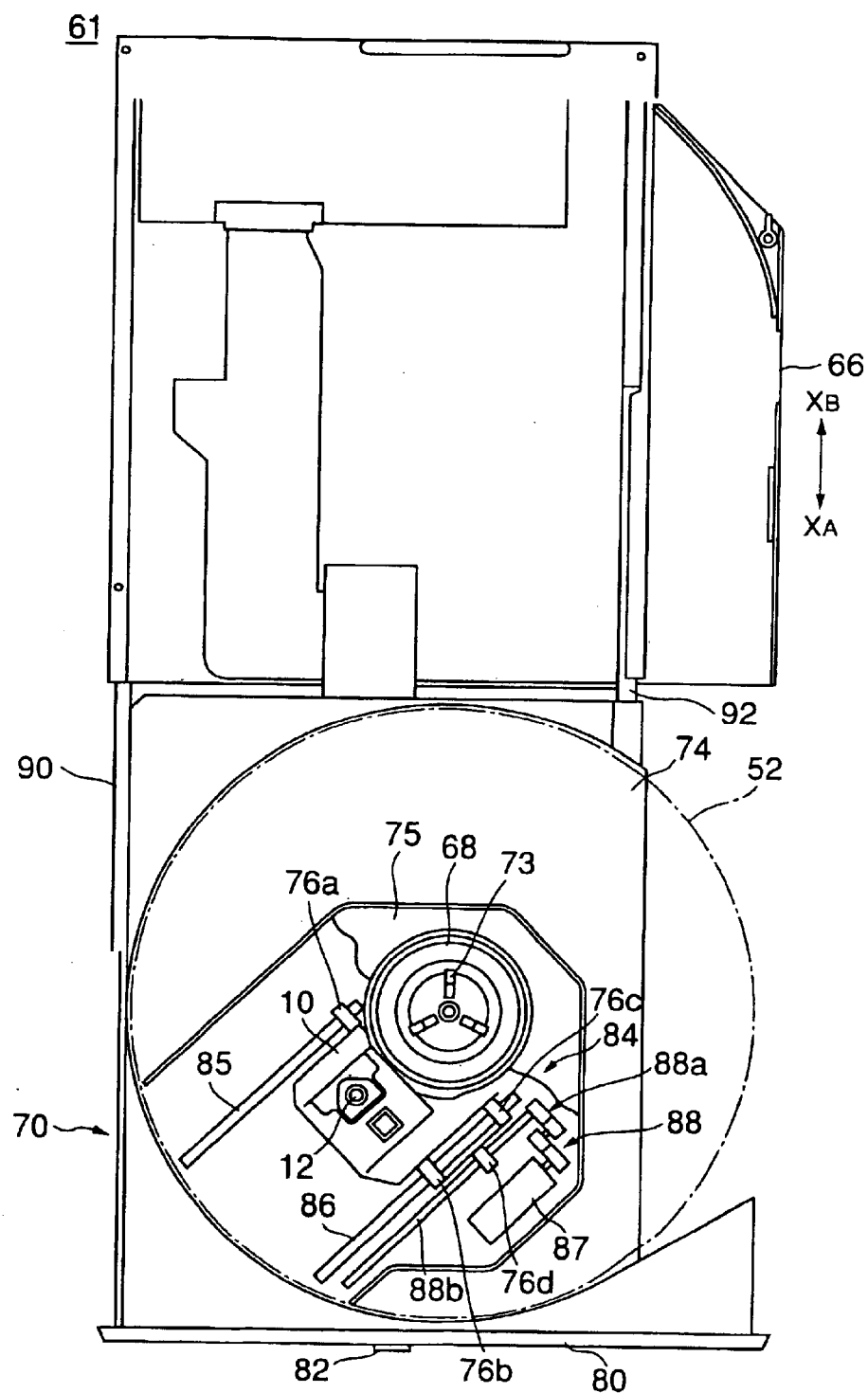
FIG. 8 is a plan view of a disk drive unit with the tray extended.

FIG. 6 is a perspective view of a disk drive unit. FIG. 7 is a plan view of a disk drive unit. FIG. 8 is a plan view of a disk drive unit with the tray extended.

As shown in FIG. 6, a disk drive unit 61 is for example a CD-ROM drive unit installed in a laptop-type personal computer, and includes a top cover (for ease of description not shown in the diagram), a bottom cover 66, with a turntable 68 rotatably supported by a tray 70 in a space created between the top cover and the bottom cover 66. At a center of the turntable 68 there is a clamp mechanism 73 for engaging a disk 52 at an inner periphery of the disk 52 so as to clamp the disk 52 firmly onto the turntable 68. A disk container 74 having a diameter larger than that of the disk 52 is disposed around an outer periphery of the turntable 68.

The optical pick-up device 10 for reading information recorded on the disk 52 clamped to the turntable by the clamping mechanism 73 of the turntable 68 is mounted below the disk container 74 so as to be movable in a direction of a radius of the disk 52 (hereinafter radial direction of the disk). The optical pick-up device 10 is contained in a concavity 74a of the disk container 74. A pick-up cover 78 having an opening 78a that is as large as the range of movement of the object lens 12 of the optical pick-up device 10 covers the concavity 74a.

The opening 78a in the pick-up cover 78 extends in a direction that is at a diagonal, that is, an angle of approximately 45 degrees with respect to the tray 70, that is, the direction indicated by an arrow Xa–Xb. The optical pick-up device 10 is also movable along the opening 78a in the pick-up cover 78 in the same diagonal direction.

An eject button 82 is provided on a center of a front bezel 80 joined to a proximal edge the tray 70.

When a disk motor 69 provided beneath the turntable 68 is activated, thus rotating the turntable 68 and the disk 52 clamped onto the turntable 68 by the clamping mechanism 73, the air at the center of the rotation is moved to the outer periphery of the disk by the centrifugal force of rotation.

As shown in FIG. 8, the tray 70 is supported by guide rails 90, 92 along both sides thereof so that the tray 70 is slidable in the proximal and distal directions. When the eject button 82 provided on the front bezel 80 is pressed, the tray 70 lock is released and the released tray 70 is slid manually in the direction shown as Xa in FIGS. 7 and 8 to a point at which the disk may be replaced. After the disk 52 has been clamped onto the turntable 68 of the tray 70, the tray 70 is then pushed manually back in the direction shown as Xb in FIGS. 7 and 8 until locked in a disk loaded position shown in FIG. 7.

A description will now be given of a pick-up drive mechanism 84 that moves the optical pick-up device 10 in a radial direction of the disk.

As shown in FIGS. 7 and 8, the pick-up drive mechanism 84 comprises a pair of guide shafts 85, 86 that guide the optical pick-up device 10 in a diagonal direction indicated by the dashed lines in FIG. 7, a drive motor 87 that drives the optical pick-up device 10, and a transmission mechanism 88 that transmits the rotational drive force of the drive motor 87 to the optical pick-up device 10. Bearings 76a, 76b and 76c project from both lateral surfaces of the optical pick-up device 10 and are fitted to the guide shafts 85, 86, such that the optical pick-up device is guided by the guide shafts 85, 86. The transmission mechanism 88 comprises a gear assembly 88a that reduces the rotation of the drive motor 87 and a lead screw 88b that is rotatably driven via the gear assembly 88a. The optical pick-up device 10 has an engaging part 76d that engages the threads of the lead screw 88b.

A description will now be given of a movement operation of the optical pick-up device.

Figure 9:
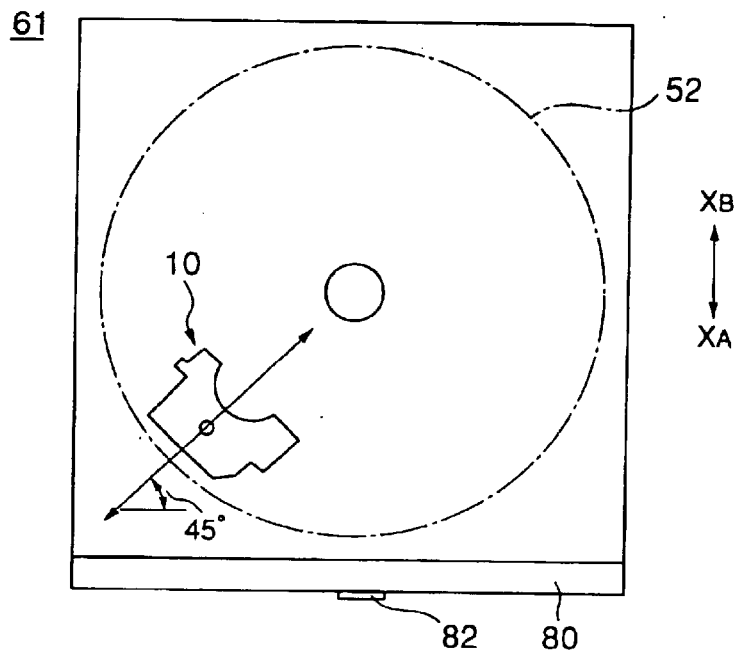
FIG. 9 is a plan view of a disk drive, a double-headed arrow showing a direction of movement of the optical pick-up device.

FIG. 9 is a plan view of a disk drive, a double-headed arrow showing a direction of movement of the optical pick-up device.

As shown in FIG. 9, the optical pick-up device 10 is moved along the diagonal of the tray 70 by the transmission of the rotation of the drive motor 87 to the lead screw 88b via the gear assembly 88a.

Figure 10:
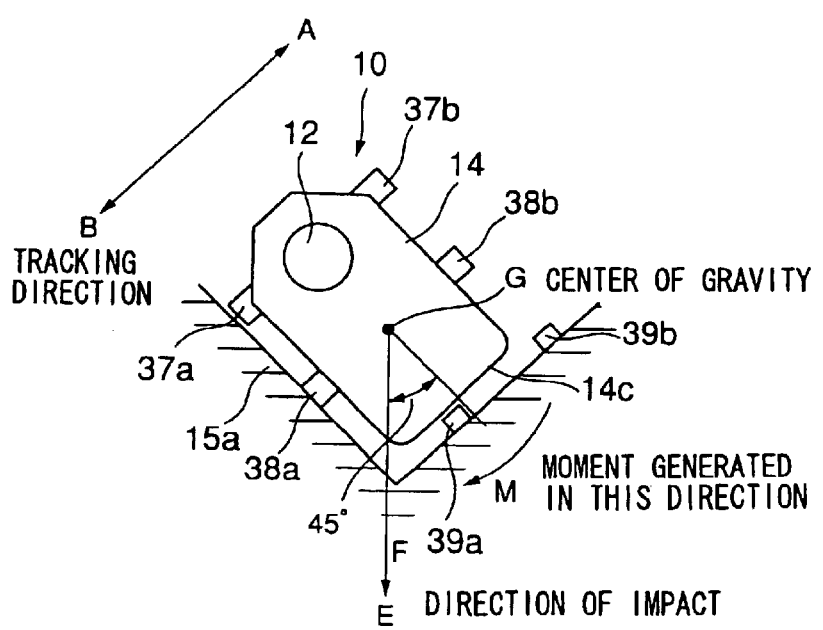
FIG. 10 shows a load acting on an optical pick-up device according to the present invention when the disk device has been dropped.

FIG. 10 shows a load acting on an optical pick-up device according to the present invention when the disk device has been dropped.

As shown in FIG. 10, when the disk drive unit 61 is dropped on the front bezel 80, a force F acts in a direction E on the optical pick-up device because the optical pick-up device 10 is designed to move along the diagonal of the tray 70. In such a case, the force of impact F acts on the optical pick-up device 10 at an angle of approximately 45 degrees with respect to the direction in which the four cantilever springs 26a–26d extend. Additionally, because the force of impact F acts downward with respect to the center of gravity G of the lens holder 14, a rotational moment M is generated about the center of gravity G.

As a result, the lens holder 14, supported as it is by the four cantilever springs 26a–26d, moves in the direction E in which the force of impact F acts. Initially the second projection 38a contacts the inner surface of the arm 15a of the frame 15, and then the third projection 39a contacts the distal end 14c of the lens holder 14 so that the lens holder 14 does not rotate in the clockwise direction (see FIG. 5).

Accordingly, even when the disk drive unit 61 is dropped a rotational moment due to the force of impact F does not affect the lens holder 14 and thus damage to the four cantilever springs 26a–26d can be prevented.

Figure 11:
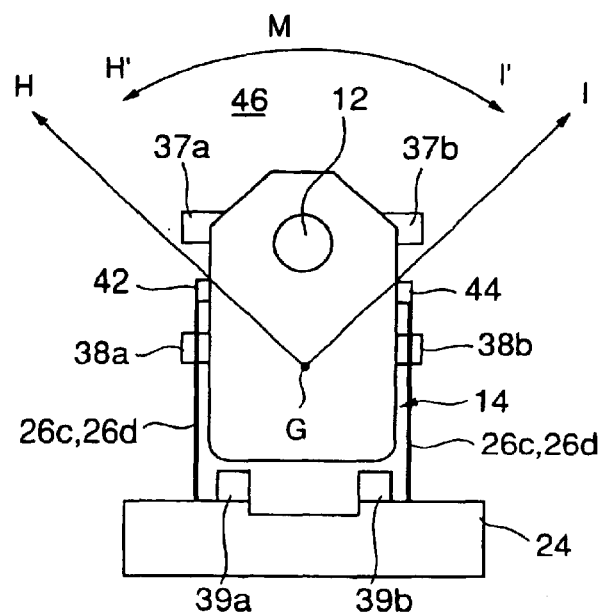
FIG. 11 is a schematic diagram showing a direction of effect of a rotational moment in the event of an impact acting in directions H, I on a lens holder center of gravity G.

FIG. 11 is a schematic diagram showing a direction of effect of a rotational moment in the event of a force of impact acting in directions H, I on a lens holder center of gravity G.

As shown in FIG. 11, in the case of a force of impact operating in directions H, I on the lens holder 14 center of gravity G, the rotational moment M acts in the H', I' directions. However, a rotation of the lens holder 14 is prevented by the first set of projections 37a, 37b projected from the proximal end of the lens holder 14 and the second set of projections 38a, 38b contacting the inner surfaces of the arms 15a, 15b of the frame 15. Accordingly, a rotation moment M in the H', I' directions is prevented by the first set of projections 37a, 37b and the second set of projections 38a, 38b.

Figure 12:
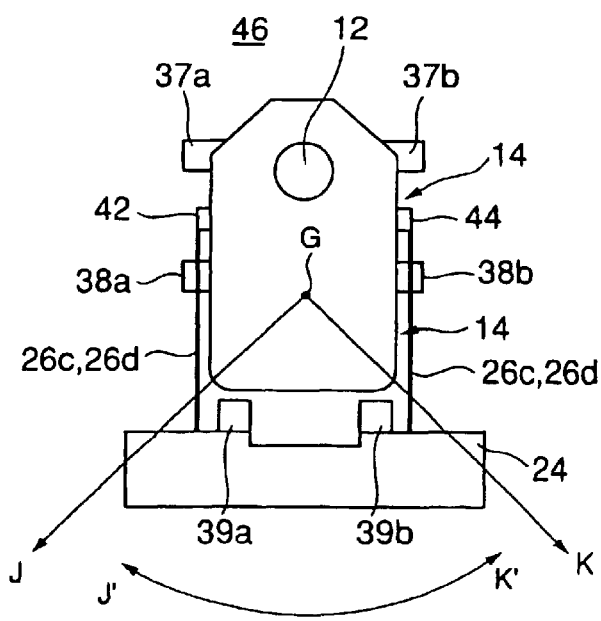
FIG. 12 is a schematic diagram showing a direction of effect of a rotational moment in the event of an impact acting in directions J, K on a lens holder center of gravity G.

FIG. 12 is a schematic diagram showing a direction of effect of a rotational moment in the event of a force of impact acting in directions J, K on a lens holder center of gravity G.

As shown in FIG. 12, in the case of a force of impact operating in directions J, K on the lens holder 14 center of gravity G, the rotational moment M acts in the J', K' directions. However, a rotation of the lens holder 14 is prevented by the second set of projections 38a, 38b projected from the lateral surfaces of the lens holder 14 contacting the inner surfaces of the arms 15a, 15b of the frame 15 and by the third set of projections 39a, 39b provided on the suspension holder 24 contacting the distal end 14c of the lens holder 14. Accordingly, a rotation moment M in the J', K' directions is prevented by the second set of projections 38a, 38b and the third set of projections 39a, 39b.

Figure 13:
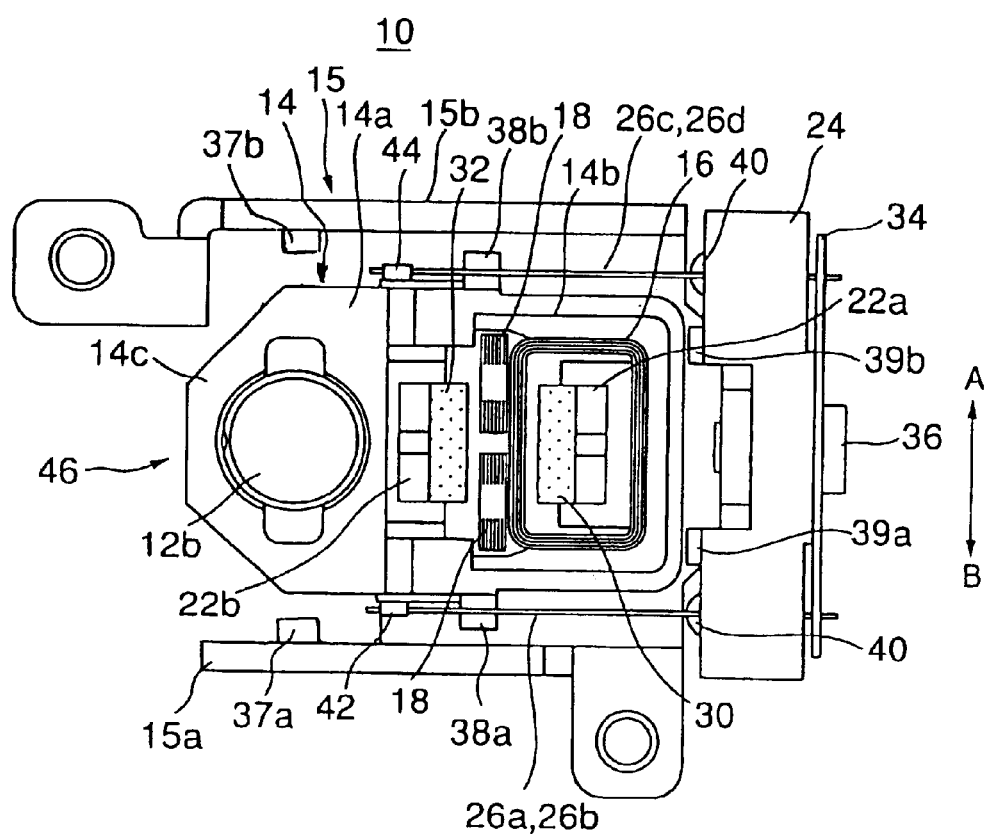
FIG. 13 is a plan view of an optical pick-up device according to one variation of the present invention.

As can be appreciated by those of ordinary skill in the art, although the present invention has been described with reference to embodiments in which projections functioning as stoppers are provided on the lateral surfaces of the lens holder 14 and on the suspension holder 24, the present invention is not limited to such embodiments but includes also configurations in which, for example, projections that prevent a rotation of the lens holder 14 are provided on the lateral surfaces of the frame 15, as shown in FIG. 13. FIG. 13 is a plan view of an optical pick-up device according to one variation of the present invention.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the scope and spirit of the present invention.

The present application is based on Japanese Priority Application No. 2000-377692 filed on Dec. 12, 2000, the entire contents of which are hereby incorporated by reference.

What is claimed is:

1. An optical pick-up device comprising:
   a lens that focuses light onto a surface of a recording medium;
   a lens holder that holds the lens;
   a suspension holder that supports the lens holder disposed opposite a distal end of the lens holder;
   a frame formed so as to be disposed opposite both lateral surfaces of the lens holder and the distal end of the lens holder, the frame supporting the suspension holder;
   a plurality of elastic supports that movably support the lens holder, a distal end of the elastic supports mounted on the suspension holder and a proximal end retained by the lens holder; and
   an actuator that drives the lens holder, the actuator including a focus coil, a tracking coil and at least one magnet,
   wherein a plurality of projections are provided on at least one of the frame and the suspension holder, with the projections acting as stoppers that restrict rotation of the lens holder so as to prevent excessive deformation of the elastic supports with at least one of said plurality of projections being provided on said frame in addition to another projection which is provided on the lens holder being laterally disposed in an arrangement spaced side by side along the same plane and in parallel to one another relative to the recording surface.

2. An optical device as defined in claim 1 wherein the distance separating the second projections from the recording surface is smaller than the distance separating the first projections from the recording surface.

3. An optical pick-up device comprising:
   a lens that focuses light onto a surface of a recording medium;
   a lens holder that holds the lens;
   a suspension holder that supports the lens holder disposed opposite a distal end of the lens holder;
   a frame formed so as to be disposed opposite both lateral surfaces of the lens holder and the distal end of the lens holder, the frame supporting the suspension holder;
   a plurality of elastic supports that movably support the lens holder, a distal end of the elastic supports mounted on the suspension holder and a proximal end retained by the lens holder;

an actuator that drives the lens holder, the actuator including a focus coil, a tracking coil and at least one magnet, and a plurality of projections disposed on the lens holder including first and second projections wherein the first projections are located at both sides thereof, with the elastic supports directly fixed to the lens holder and wherein the second projections are laterally separated from the first projections at a predetermined distance and lie along the same plane;

each of said first projections and a respective one of said second projections being disposed in an arrangement side by side, along the same plane and in parallel with respect to the recording surface and;

wherein the second projections project a sufficient distance from the lens holder such that, even if the first projections come into contact with the frame and the lens holder rotates about a projection end of the first projections, the rotation will be controlled by the second projections so that the elastic support is prevented from being deformed physically.

4. The optical pick-up device as claimed in claim 3, wherein at least one projection is provided at a position proximal of a position at which the plurality of elastic supports support the lens holder.

5. The optical pick-up device as claimed in claim 4, wherein at least two projections are provided on each of two lateral surfaces of either the frame or the lens holder.

6. The optical pick-up device as claimed in claim 3, wherein the elastic supports are cantilever springs.

7. The optical pick-up device as claimed in claim 3 wherein the first projections and the second projections have outer surfaces at the respective ends thereof which project from the lens holder approximately the same distance.

8. An optical pick-up device comprising:

a lens that focuses light onto a surface of a recording medium;

a lens holder that holds the lens;

a suspension holder that supports the lens holder disposed opposite a distal end of the lens holder;

a frame formed so as to be disposed opposite both lateral surfaces of the lens holder and the distal end of the lens holder, the frame supporting the suspension holder;

a plurality of elastic supports that movably support the lens holder, a distal end of the elastic supports mounted on the suspension holder and a proximal end retained by the lens holder;

an actuator that drives the lens holder, the actuator including a focus coil, a tracking coil and at least one magnet, and a plurality of projections disposed on the lens holder including first and second projections wherein the first projections are located at both sides thereof, with the elastic supports directly fixed to the lens holder and wherein the second projections are laterally separated from the first projections at a predetemiined distance and lie along the same plane, and wherein the plurality of projections is provided at least on the lateral surfaces of the lens holder toward the proximal end of the lens holder and on a surface of the suspension holder opposite the distal end of the lens holder with the projections acting as stoppers that restrict rotation of the lens holder by said plurality of elastic supports.

9. An optical device as defined in claim 8 wherein the distance separating the second projections from the recording surface is smaller than the distance separating the first projections from the recording surface.

* * * * *